United States Patent [19]

Durno et al.

[11] Patent Number: 4,540,141
[45] Date of Patent: Sep. 10, 1985

[54] FAIL-SAFE TAIL ROTOR CONTROL SYSTEM

[75] Inventors: Ronald A. Durno, Trumbull, Conn.; Rudolph F. Huber, Jupiter, Fla.

[73] Assignee: United Technologies Corporation, Hartford, Conn.

[21] Appl. No.: 534,891

[22] Filed: Sep. 22, 1983

[51] Int. Cl.³ .............................................. B64C 13/30
[52] U.S. Cl. .................................. 244/17.19; 244/232; 244/233; 74/501.5 R; 74/96
[58] Field of Search ................. 244/233, 17.19, 17.21, 244/232, 75 R, 90 R; 74/96, 110, 469, 470, 501 R, 501.5 R, 486, 487

[56] References Cited

U.S. PATENT DOCUMENTS

| | | | |
|---|---|---|---|
| 2,280,106 | 4/1942 | Sturgess | 74/501.5 |
| 2,787,916 | 4/1957 | Cushman | 74/501.5 |
| 4,170,147 | 10/1979 | Dunno et al. | 244/233 |
| 4,186,622 | 2/1980 | Cooper | 244/233 |
| 4,198,877 | 4/1980 | Huling | 74/501.5 R |

Primary Examiner—Galen Barefoot
Attorney, Agent, or Firm—Russell M. Lipes, Jr.

[57] ABSTRACT

Helicopter tail rotor control system having a quadrant (18) with two flexible cables (20,22) wrapped around the quadrant surface in opposing directions and each attached to the quadrant at a point (42,60) opposite to initial contact of the cable with the quadrant, and spring extension (44, 62) from each cable passing around a pulley (46) and attached to the quadrant at a point on a radial line with the cable attachment.

9 Claims, 6 Drawing Figures

FAIL-SAFE TAIL ROTOR CONTROL SYSTEM

DESCRIPTION

1. Technical Field

This invention relates to a helicopter flight control system for the tail rotor which affords operation of the system in the event of cable severance and which minimizes the loads imposed upon the control system.

2. Background Art

Previous designs of flight control systems to provide control of the tail rotor of a helicopter after a flexible control cable has been severed or broken have in most instances been directed to systems employing a servo boost unit which isolates the helicopter pilot from the flight and other loads imposed upon the system. In smaller helicopters where both weight and cost factors preclude the use of specific servo boost units, care must be taken to keep to a minimum the loads which the pilot feels through foot and hand controls. This is important particularly with regard to pilot fatigue as well as control sensitivity.

In the redundant flight control system described in U.S. Pat. No. 4,186,622, the loading of the bungee springs is such that without the mechanical advantage provided by the mixing unit, the pilot's feet would be subject to varying loads as the quadrant is rotated. Similarly, in U.S. Pat. No. 4,170,147 the arrangement is such that the loading would be increased on one foot or the other as the control quadrant is actuated.

DISCLOSURE OF INVENTION

An object of the invention is the provision of a helicopter tail rotor flight control system which offers control protection in the event one or both flexible cables is severed or broken and which avoids high varying loads during normal control operation.

Another object of the invention is to provide in a helicopter tail rotor flight control system a spring loading of the control quadrant which affords quadrant operation in the event of severance or breakage of one of the flexible cables and yet which does not impose excessive loads on the pilot during the flight regime.

The foregoing and other objects, features and advantages will be apparent from the specification and claims and from the accompanying drawings which illustrate embodiments of the invention.

BEST MODE FOR CARRYING OUT THE INVENTION

Figure 1:
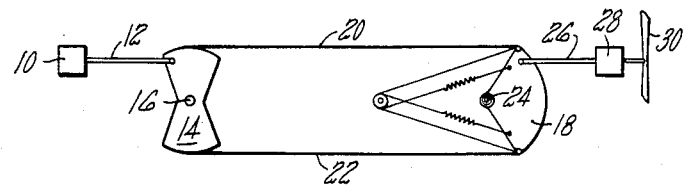
FIG. 1 is a schematic showing of the helicopter flight control system in which our invention would be used.

In the schematic showing of FIG. 1, pilot actuated foot pedals 10 through linkage 12 directly actuate member 14 which rotates about axis 16 in response to pedal pressure. There is no pilot boost unit connected to the foot pedals as is commonly used, particularly on larger helicopters. Member 14 is connected to control quadrant 18 by flexible cables 20 and 22 to rotate the quadrant about axis 24 in either a clockwise or counterclockwise direction. Quadrant 18 is connected by link 26 to tail rotor servo 28 which varies the pitch of helicopter tail rotor 30 to control the yaw moment imposed upon the helicopter.

Figure 2:
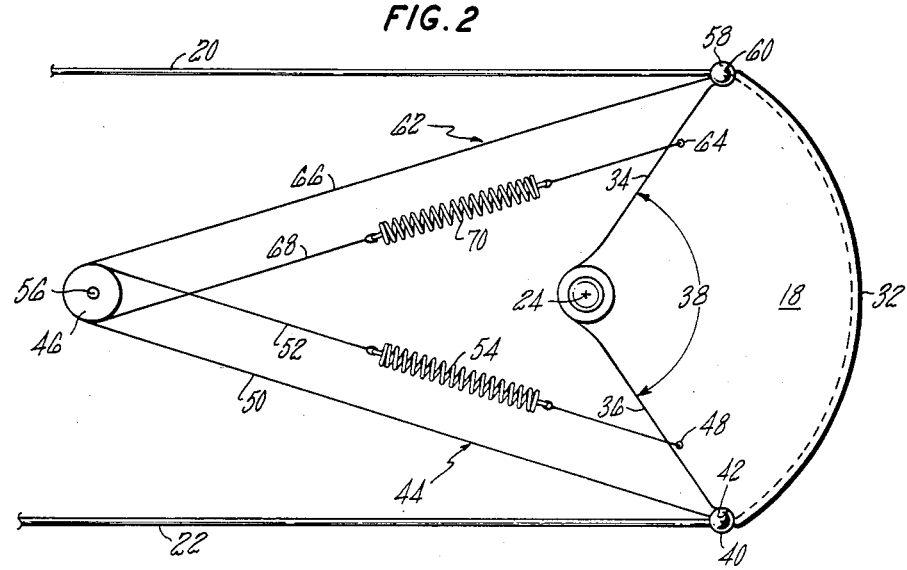
FIG. 2 is an enlarged showing of a portion of the FIG. 1 system showing the details of the flexible cable and spring connections with the control system quadrant in a neutral position.

FIG. 2 shows in detail the connection of cables 20 and 22 to quadrant 18. The quadrant has perimeter surface 32 and faces 34 and 36, the included angle 38 between the faces in a preferred embodiment being about 110°. Cable 20 is wrapped around quadrant surface 32 in a clockwise direction, in one of two grooves in surface 32, and has ball 40 swaged thereon which fits in collar 42 on the quadrant at the intersection of perimeter surface 32 and face 36. An extension 44 of cable 20, which may be either integral therewith or a separate element attached to the cable at ball 40, passes in a clockwise direction around pulley 46 and is attached to the quadrant at point 48 adjacent face 36. The two legs 50 and 52 of extension 44 are essentially parallel and a portion of leg 52 includes coil spring 54. The rotational axis 56 of pulley 46 is aligned with the centerline of rotational axis 24 of quadrant 18, in the view shown the aligned axes being the horizontal axis.

In a similar though opposite fashion, cable 22 is wrapped around quadrant surface 32 in a counterclockwise direction in the other of the two surface grooves. The cable has ball 58 swaged thereon which fits in collar 60 on the quadrant at the intersection of perimeter surface 32 and face 34. An extension 62 of cable 22, which may be either integral therewith or a separate element attached to the cable at ball 58, passes in a counterclockwise direction around a pulley similar to and behind pulley 46 and coaxial therewith and is attached to the quadrant at point 64 adjacent face 34. The two legs 66 and 68 of extension 62 are essentially parallel and a portion of leg 68 includes coil spring 70.

Figure 3:
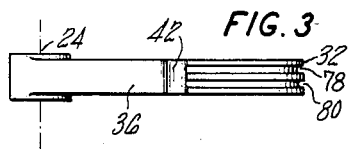
FIG. 3 is a side view of the control system quadrant.
Figure 4:
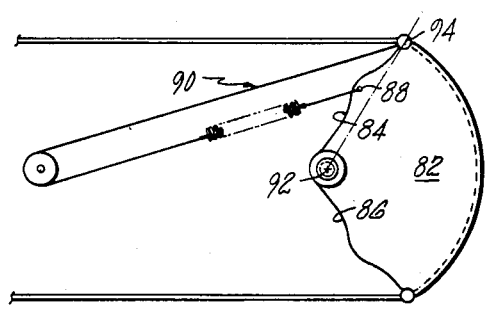
FIG. 4 is a showing of one of the two flexible cable and spring connections to the control system quadrant.

FIG. 3 is a side view of quadrant 18 showing the two perimeter surface grooves 78 and 80 for receiving cables 20 and 22. In FIG. 4 a quadrant 82 of slightly different shape is shown with only one of the two control cables being shown in position. Faces 84 and 86 are somewhat bowed so that the attachment point 88 for cable extension 90 is at a location below a line containing quadrant rotational axis 92 and collar 94. The attachment point for the other cable, not shown, would be similarly located on face 86. Such attachment location is believed to provide some benefit in force balance.

Figure 5:
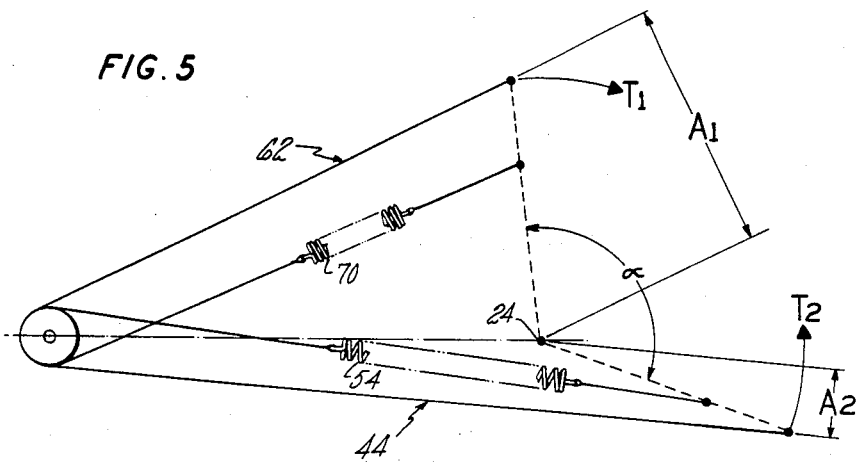
FIG. 5 is a showing of the flexible cable and spring reaction to a counterclockwise movement of the control system quadrant.

In the showing of FIG. 5, quadrant 18 of FIG. 1 is assumed to have rotated about axis 24 in a counterclockwise direction to a position where moment arm A1 for extension 62 of cable 22 is several times that of moment arm A2 for extension 44 of cable 20. In rotating to this position, the loading on spring 70 has diminished and the spring has contracted and the loading on spring 54 has increased and the spring has extended. In each instance the product of moment arm and spring force tends to remain constant. Thus, during normal operation of the tail rotor control system the loading on the pilot's foot pedals remain relatively constant and the force feedback into the control system is minimized. The angle α between the lines on which the spring attachment points are located can be optimized to produce a resulting moment that is near to zero.

Failure of one of the two flexible control cables 20 or 22 will not result in the remaining cable force rotating the quadrant to an extreme position because of the opposing spring loading. For example, in the event of breakage or severance of cable 20 and loss of its load opposing that of cable 22, spring 70 will react in whole or in part the load of cable 22. Quadrant 18 will be restrained from clockwise movement to its extreme clockwise position and control of the tail rotor essentially can be maintained through the undamaged cable 22. Conversely, failure of cable 22 will result in spring 54 reacting in whole or in part the load of cable 20.

Figure 6:
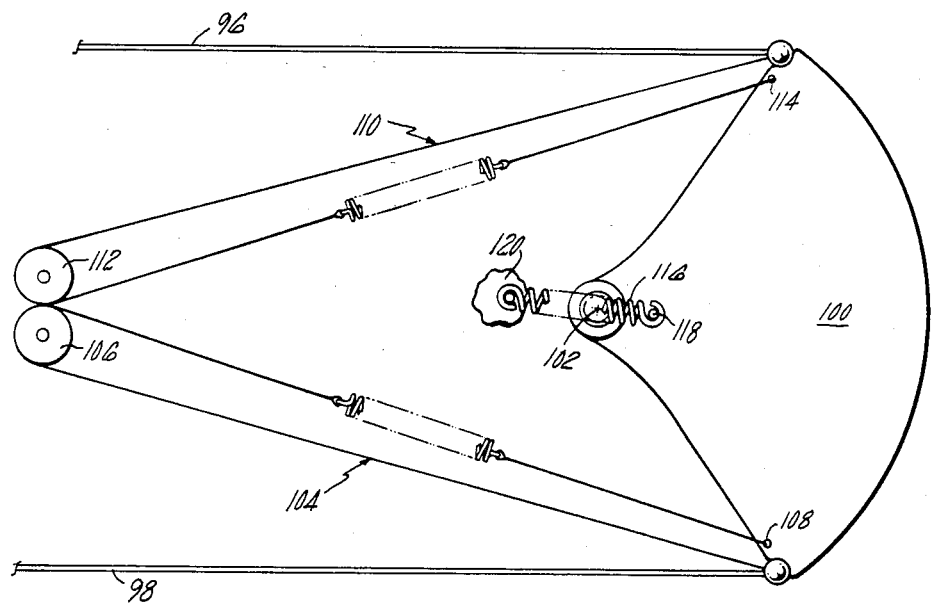
FIG. 6 is a showing of a quadrant and cable system for a particular helicopter model.

FIG. 6 is a simplified showing of a quadrant and cable system in accordance with this invention for a particular helicopter model as determined by a computer study. Cables 96 and 98 are connected to quadrant 100 which rotates about axis 102. Cable 96 passes around the perimeter of the quadrant in a clockwise direction and has extention 104 which passes around pulley 106 in a clockwise direction and is attached to the quadrant at point 108. Similarly, cable 98 passes around the perimeter of the quadrant, but in a counterclockwise direction, and has extension 110 which passes around pulley 112 in a counterclockwise direction and is attached to the quadrant at point 114. The pulleys are not coaxial as in the quadrant system shown in FIG. 2, but are spaced on either side of the system's centerline. This was done because of a space problem in the helicopter model. Also, in this embodiment, spring 116, a negative gradient spring, is attached to quadrant 100 at 118 and to fixed surface 120, the two points of attachment being oppositely displaced from the system's centerline so that the centerline of the spring passes through the centerline of axis 102. This provides a bias to the centering action of the quadrant system to counteract a centering spring in the tail rotor servo, not shown, so that a predetermined tail rotor blade angle can be attained to return the helicopter to the ground by means of a head-on landing in the event of failure of both flexible cables connected to the quadrant. The bias could be in either direction and of any value depending upon the tail rotor blade angle to be established which will vary from model to model.

It should be understood that the invention is not limited to the particular embodiment shown and described herein, but that various changes and modifications may be made without departing from the spirit or scope of this concept as defined by the following claims.

We claim:

1. In a flight control system for the tail rotor of a helicopter, a partially circular member rotatable about a center axis and having flexible cables for rotating said member about said axis wrapped entirely about and connected to opposite sides of said member and extending therefrom in the same essentially parallel direction and spring means extending from each cable at its connections with said member, each spring means being wrapped around pulley means spaced from said member and located between said cables, the end of each spring means being attached to said member on the same side of said center axis as its cable member connection.

2. In a flight control system for the tail rotor of a helicopter in accordance with claim 1, one of each of said spring means portions being in the form of a coil spring.

3. In a flight control system for the tail rotor of a helicopter in accordance with claim 1, each spring means including a first portion extending from the connection of its cable to said member to said pulley means and a second portion extending from said pulley means to said member, said first and second portions being essentially parallel.

4. In a flight control system for the tail rotor of a helicopter in accordance with claim 1, the connection of each flexible cable to said circular member is along a radial line having an included angle of substantially less than 180°.

5. In a flight control system for the tail rotor of a helicopter in accordance with claim 4, the connection of the end of said spring means to said circular member is along substantially the same radial line as that of the flexible cable connection.

6. In a flight control system for the tail rotor of a helicopter in accordance with claim 4, the connection of the end of said spring means to said circular member is along a different radial line than that of the flexible cable connection.

7. In a flight control system for the tail rotor of a helicopter, an arcuate member having an axis of rotation, a first cable extending to and engaging said member on one side of said axis and wrapped in a clockwise direction about said member to a releasable connection with the member on the opposite side of said axis, a second cable extending to and engaging said member on the other side of said axis and wrapped in a counterclockwise direction about said member to a releasable connection with the member on the opposite side of said axis, pulley means located between said first and said second cables and spaced from said member, first spring means extending from said first cable releasable connection around said pulley means in a clockwise direction and connected to said member on the same side of said member as said first cable releasable connection, and second spring means extending from said second cable releasable connection around said pulley means in a counterclockwise direction and connected to said member on the same side of said member as said second cable releasable connection.

8. A flight control system for the tail rotor of a helicopter in accordance with claim 7 in which said first and second spring means including coil springs between said pulley means and said member connections.

9. A flight control system for the tail rotor of a helicopter in accordance with claim 7 in which the connections of said first and second spring means to said member are on substantially the same radial lines from said rotatable member axis as the radial lines on which said cable releasable connections are located.

* * * * *